United States Patent
Gummadi et al.

(10) Patent No.: US 11,388,637 B1
(45) Date of Patent: Jul. 12, 2022

(54) CELL SELECTION FOR CONDITIONAL HANDOVER

(71) Applicant: QUALCOMM Incorporated, San Diego, CA (US)

(72) Inventors: Bapineedu Chowdary Gummadi, Hyderabad (IN); Lekhya Pavani Godavarthi, Hyderabad (IN); Kishore Danta, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 17/145,054

(22) Filed: Jan. 8, 2021

(51) Int. Cl.
  *H04W 4/00* (2018.01)
  *H04W 36/00* (2009.01)
  *H04W 76/28* (2018.01)

(52) U.S. Cl.
  CPC . *H04W 36/00837* (2018.08); *H04W 36/0058* (2018.08); *H04W 36/00835* (2018.08); *H04W 76/28* (2018.02)

(58) Field of Classification Search
  None
  See application file for complete search history.

(56) References Cited

U.S. PATENT DOCUMENTS

2020/0351735 A1* 11/2020 Latheef .......... H04W 36/00837

* cited by examiner

*Primary Examiner* — Suhail Khan
(74) *Attorney, Agent, or Firm* — Muncy, Geissler, Olds & Lowe, P.C.

(57) ABSTRACT

Techniques to select a cell for conditional handover (CHO) are disclosed. A user equipment (UE) may receive a CHO command from a serving cell. The CHO command may include a CHO configuration, which in turn may include one or more CHO conditions and a plurality of cells. The one or more CHO conditions may specify one or more conditions, when met by any of the plurality of cells, may trigger a handover from the serving cell to a target cell. When multiple cells of the plurality of cells meet the one or more CHO conditions, the UE may select one of them as the target cell and perform the handover. The UE may consider several factors in selecting the target cell. The factors may include channel conditions, bandwidths, whether the UE is operating as a multiSIM, and cell priorities.

30 Claims, 7 Drawing Sheets

CELL SELECTION FOR CONDITIONAL HANDOVER

TECHNICAL FIELD

Various aspects described herein generally relate to wireless communication systems, and more particularly, to selecting a cell for a conditional handover (CHO).

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or Worldwide Interoperability for Microwave Access (WiMAX)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G New Radio (NR) connectivity, or simply NR connectivity, has gained significant commercial traction in recent time. Thus, to attract more users to their network, network operators would like to show NR connectivity to users most of the time on the user interface (UI) of the mobile device such as the user equipment (UE).

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary user equipment (UE) is disclosed. The UE may comprise a processor, a memory, and a transceiver. The processor, the memory, and/or the transceiver may be configured to receive a conditional handover (CHO) command from a serving cell. The CHO command may include a CHO configuration comprising one or more CHO conditions and a plurality of cells. The one or more CHO conditions may specify one or more conditions, when met by one or more of the plurality of cells, may trigger a handover of the UE from the serving cell to a target cell, the target cell being one of the plurality of cells. The processor, the memory, and/or the transceiver may also be configured to select a target cell among multiple CHO candidate cells. Each CHO candidate cell may be a cell of the plurality of cells that satisfies the one or more CHO conditions. In selecting the target cell, the memory, and/or the transceiver may be configured to select the target cell among the multiple CHO candidate cells based on discontinuous reception (DRX) configurations of the multiple CHO candidate cells when the UE is a multiple subscriber identity module (multiSIM) UE. The processor, the memory, and/or the transceiver may further be configured to perform a handover to the target cell.

An exemplary method of a user equipment (UE) is disclosed. The method may comprise receiving a conditional handover (CHO) command from a serving cell. The CHO command may include a CHO configuration comprising one or more CHO conditions and a plurality of cells. The one or more CHO conditions may specify one or more conditions, when met by one or more of the plurality of cells, may trigger a handover of the UE from the serving cell to a target cell, the target cell being one of the plurality of cells. The method may also comprise selecting a target cell among multiple CHO candidate cells. Each CHO candidate cell may be a cell of the plurality of cells that satisfies the one or more CHO conditions. Selecting the target cell may comprise selecting the target cell among the multiple CHO candidate cells based on discontinuous reception (DRX) configurations of the multiple CHO candidate cells when the UE is a multiple subscriber identity module (multiSIM) UE. The method may further comprise performing a handover to the target cell.

Another exemplary user equipment (UE) is disclosed. The UE may comprise means for receiving a conditional handover (CHO) command from a serving cell. The CHO command may include a CHO configuration comprising one or more CHO conditions and a plurality of cells. The one or more CHO conditions may specify one or more conditions, when met by one or more of the plurality of cells, may trigger a handover of the UE from the serving cell to a target cell, the target cell being one of the plurality of cells. The UE may also comprise means for selecting a target cell among multiple CHO candidate cells. Each CHO candidate cell may be a cell of the plurality of cells that satisfies the one or more CHO conditions. The means for selecting the target cell may select the target cell among the multiple CHO candidate cells based on discontinuous reception (DRX) configurations of the multiple CHO candidate cells when the UE is a multiple subscriber identity module (multiSIM) UE. The UE may further comprise means for performing a handover to the target cell.

A non-transitory computer-readable medium storing computer-executable instructions for a user equipment (UE) is disclosed. The executable instructions may comprise one or more instructions instructing the UE to receive a conditional handover (CHO) command from a serving cell. The CHO command may include a CHO configuration comprising one or more CHO conditions and a plurality of cells. The one or more CHO conditions may specify one or more conditions, when met by one or more of the plurality of cells, may trigger a handover of the UE from the serving cell to a target cell, the target cell being one of the plurality of cells. The executable instructions may also comprise one or more instructions instructing the UE to select a target cell among multiple CHO candidate cells. Each CHO candidate cell may be a cell of the plurality of cells that satisfies the one or more CHO conditions. In selecting the target cell, the one or more instructions may instruct the UE to select the target cell among the multiple CHO candidate cells based on discontinuous reception (DRX) configurations of the multiple CHO candidate cells when the UE is a multiple subscriber identity module (multiSIM) UE. The executable instructions may further comprise one or more instructions instructing the UE to perform a handover to the target cell.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
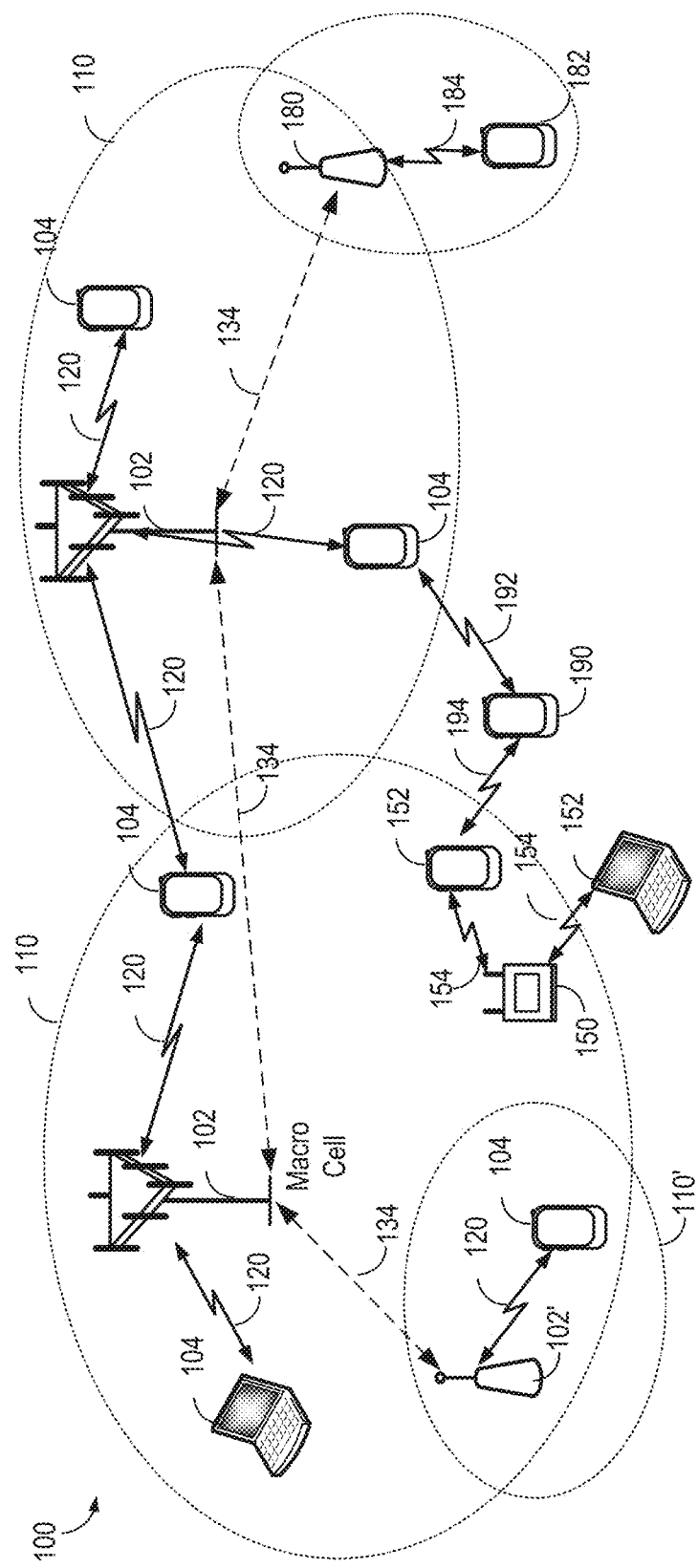
FIG. 1 illustrates an exemplary wireless communications system in accordance with one or more aspects of the disclosure.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, terms "user equipment" (UE) and "base station" are not intended to be specific or otherwise limited to any particular Radio Access Technology (RAT), unless otherwise noted. In general, UEs may be any wireless communication device (e.g., mobile phone, router, tablet computer, laptop computer, consumer asset tracking device, Internet of Things (IoT) device, etc.) used by user to communicate over wireless communications network. UE may be mobile or may (e.g., at certain times) be stationary, and may communicate with Radio Access Network (RAN). As used herein, "UE" may be referred to interchangeably as "access terminal" or "AT," "client device," "wireless device," "subscriber device," "subscriber terminal," "subscriber station," "user terminal" UT, "mobile terminal," "mobile station," or variations thereof. Generally, UEs can communicate with core network via RAN, and through the core network the UEs can be connected with external networks such as Internet and with other UEs. Of course, other mechanisms of connecting to core network and/or the Internet are also possible for UEs, such as over wired access networks, WiFi networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as Access Point (AP), Network Node, NodeB, evolved NodeB (eNB, eNodeB), general Node B (gNB, gNodeB), etc. In addition, in some systems base station may provide edge node signaling functions, while in other systems it may provide additional control and/or network management functions.

UEs can be embodied by any of a number of device types including but not limited to printed circuit (PC) cards, compact flash devices, external or internal modems, wireless or wireline phones, smartphones, tablets, consumer asset tracking devices, asset tags, and so on. Communication link through which UEs can send signals to RAN may be referred to as uplink (UL) channel (e.g., reverse traffic channel, reverse control channel, access channel, etc.). Communication link through which RAN can send signals to UEs may be referred to as downlink (DL) or forward link channel (e.g., paging channel, control channel, broadcast channel, forward traffic channel, etc.). As used herein, term traffic channel (TCH) can refer to either a UL/reverse or DL/forward traffic channel.

FIG. 1 illustrates an exemplary wireless communications system 100 according to one or more aspects. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include Evolved NodeBs (eNBs) where the wireless communications system 100 corresponds to a Long-Term Evolution (LTE) network, gNodeBs (gNBs) where the wireless communications system 100 corresponds to a 5G network, and/or a combination thereof, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighbor macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs) and/or Home gNBs (HgNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple input multiple output (MIMO) antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the radio frequency (RF) range in the electromagnetic spectrum. EHF has a range of 30 GHz to 300 GHz and a wavelength between 1 and 10 mm. Radio waves in this band may be referred to as a millimeter wave. Near mmW may extend down to a frequency of 3 GHz with a wavelength of 100 mm. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on. Any of the base stations 102, 102', 180 may send measurement requests (e.g., measurement control order (MCO)) to the UEs 104, 182, 190, and the UE's 104, 182, 190 may respond with measurement reports accordingly.

Figure 2:
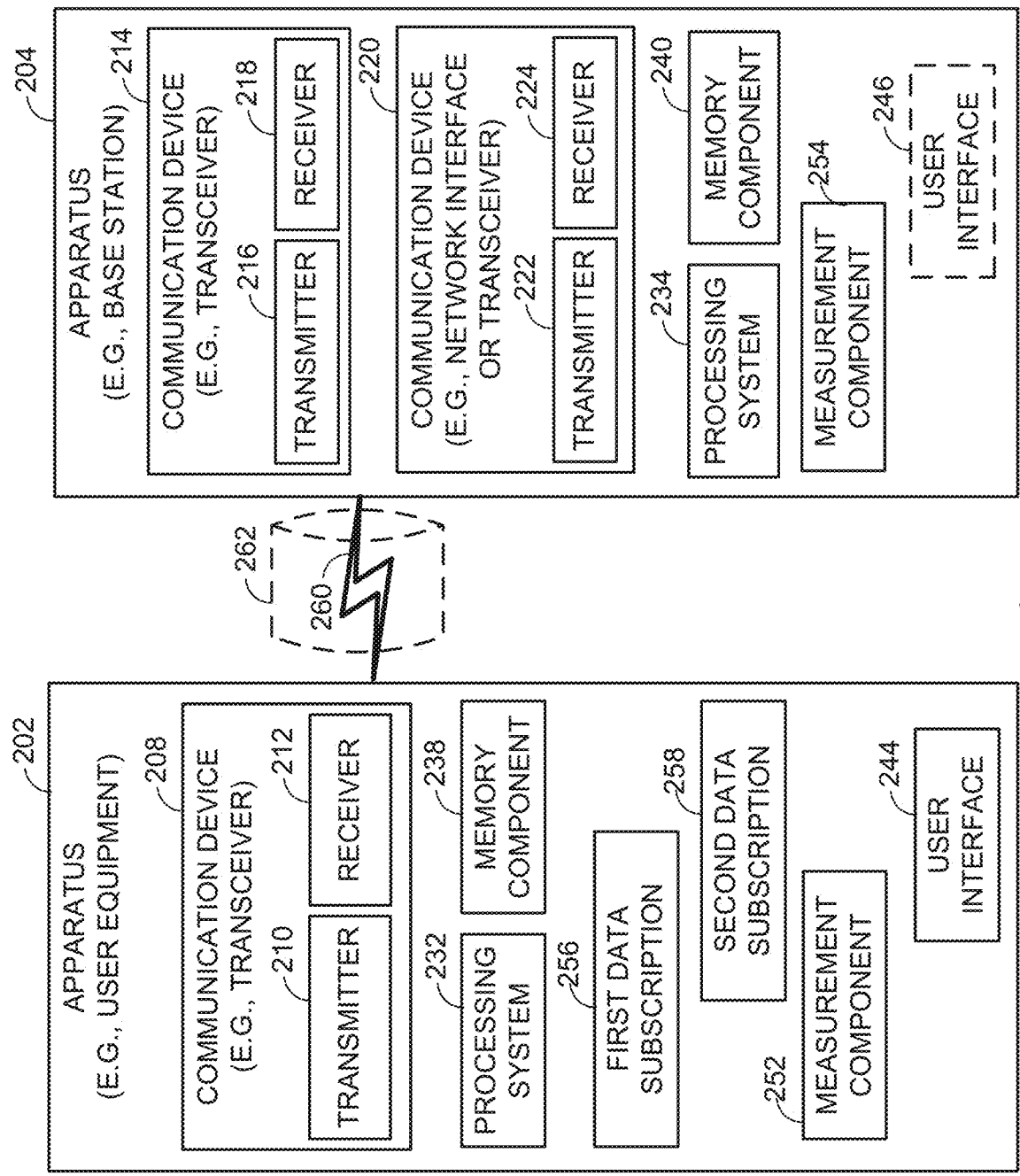
FIG. 2 is a simplified block diagram of several sample aspects of components that may be employed in wireless communication nodes and configured to support communication in accordance with one or more aspects of the disclosure.

FIG. 2 illustrates several sample components (represented by corresponding blocks) that may be incorporated into an apparatus 202 and an apparatus 204 (corresponding to, for example, a UE and a base station (e.g., eNB, gNB), respectively, to support the operations as disclosed herein. As an example, the apparatus 202 may correspond to a UE, and the apparatus 204 may correspond to a network node such as a gNB and/or an eNB. It will be appreciated that the components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 202 may include at least one wireless communication device (represented by the communication device 208) for communicating with other nodes via at least one designated RAT (e.g., LTE, NR, etc.). The communication device 208 may include at least one transmitter (represented by the transmitter 210) for transmitting and encoding signals (e.g., messages, indications, information, and so on) and at least one receiver (represented by the receiver 212) for receiving and decoding signals (e.g., messages, indications, information, pilots, and so on).

The apparatus 204 may include at least one wireless communication device (represented by the communication device 214) for communicating with other nodes via at least one designated RAT (e.g., LTE, NR, etc.). The communication device 214 may include at least one transmitter (represented by the transmitter 216) for transmitting signals (e.g., messages, indications, information, pilots, and so on) and at least one receiver (represented by the receiver 218) for receiving signals (e.g., messages, indications, information, and so on).

For one or both apparatuses 202, 204, a transmitter and a receiver may comprise an integrated device (e.g., embodied as a transmitter circuit and a receiver circuit of a single communication device) in some implementations, may comprise a separate transmitter device and a separate receiver device in some other implementations, or may be embodied in other ways in yet other implementations. In an aspect, a transmitter may include a plurality of antennas, such as an antenna array, that permits the respective apparatus to perform transmit "beamforming," as described further herein. Similarly, a receiver may include a plurality of antennas, such as an antenna array, that permits the respective apparatus to perform receive beamforming, as described further herein. In an aspect, the transmitter and receiver may share the same plurality of antennas, such that the respective apparatus can only receive or transmit at a given time, not both at the same time. A wireless communication device (e.g., one of multiple wireless communication devices) of the apparatus 204 may also comprise a Network Listen Module (NLM) or the like for performing various measurements.

The apparatus 204 may include at least one communication device (represented by the communication device 220) for communicating with other nodes. For example, the communication device 220 may comprise a network interface (e.g., one or more network access ports) configured to communicate with one or more network entities via a wire-based or wireless backhaul connection. In some aspects, the communication device 220 may be implemented as a transceiver configured to support wire-based or wireless signal communication. This communication may involve, for example, sending and receiving messages, parameters, or other types of information. Accordingly, in the example of FIG. 2, the communication device 220 is shown as comprising a transmitter 222 and a receiver 224 (e.g., network access ports for transmitting and receiving).

The apparatuses 202 and 204 may also include other components used in conjunction with the operations as disclosed herein. The apparatus 202 may include a processing system 232 for providing functionality relating to, for example, communication with the network. The apparatus 204 may include a processing system 234 for providing functionality relating to, for example, communication with the UEs. In an aspect, the processing systems 232 and 234 may include, for example, one or more general purpose processors, multi-core processors, ASICs, digital signal processors (DSPs), field programmable gate arrays (FPGA), or other programmable logic devices or processing circuitry.

The apparatuses 202 and 204 may include measurement components 252 and 254 that may be used to obtain channel related measurements. The measurement component 252 may measure one or more downlink (DL) signals such as channel state information reference signal (CSI-RS), phase tracking reference signal (PTRS), primary synchronization signal (PSS), secondary synchronization signal (SSS), demodulation reference signal (DMRS), etc. The measurement component 254 may measure one or more uplink (UL) signals such as DMRS, sounding reference signal (SRS), etc.

The apparatuses 202 and 204 may include memory components 238 and 240 (e.g., each including a memory device), respectively, for maintaining information (e.g., information indicative of reserved resources, thresholds, parameters, and so on). In various implementations, memory 238 can comprise a computer-readable medium storing one or more computer-executable instructions for a user equipment (UE) where the one or more instructions instruct apparatus 202 (e.g., processing system 232 in combination with communications device 208 and/or other aspects of apparatus 202) to perform any of the functions discussed herein. In addition, the apparatuses 202 and 204 may include user interface devices 244 and 246, respectively, for providing indications (e.g., audible and/or visual indications) to a user and/or for receiving user input (e.g., upon user actuation of a sensing device such a keypad, a touch screen, a microphone, and so on).

The apparatus 202 may include first and second data subscriptions (e.g., subscriber identify modules (SIMs)) 256 and 258 that may be associated with providing services in same or different RATs (e.g., 5G NR, 4G LTE).

For convenience, the apparatuses 202 and 204 are shown in FIG. 2 as including various components that may be configured according to the various examples described herein. It will be appreciated, however, that the illustrated blocks may have different functionality in different designs. The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 208, 232, 238, and 244 may be implemented by processor and memory component(s) of the apparatus 202 (e.g., by execution of appropriate code and/or by appropriate configuration of processor components). Similarly, some or all of the functionality represented by blocks 214, 220, 234, 240, and 246 may be implemented by processor and memory component(s) of the apparatus 204 (e.g., by execution of appropriate code and/or by appropriate configuration of processor components).

In an aspect, the apparatus 204 may correspond to a "small cell" or a Home gNodeB. The apparatus 202 may transmit and receive messages via a wireless link 260 with the apparatus 204, the messages including information related to various types of communication (e.g., voice, data, multimedia services, associated control signaling, etc.). The wireless link 260 may operate over a communication medium of interest, shown by way of example in FIG. 2 as the medium 262, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 204 and the apparatus 202 for the medium 262.

In general, the apparatus 202 and the apparatus 204 may operate via the wireless link 260 according to one or more radio access types, such as LTE, LTE-U, or NR, depending on the network in which they are deployed. These networks may include, for example, different variants of CDMA networks (e.g., LTE networks, NR networks, etc.), TDMA networks, FDMA networks, Orthogonal FDMA (OFDMA) networks, Single-Carrier FDMA (SC-FDMA) networks, and so on.

A UE may be capable of operating in multiple radio access technologies (RATs). For example, a UE may be capable of operating in a first RAT (e.g., LTE) and in a second RAT (e.g., NR). These are merely examples, and first and second RATs may be any of the RATs currently known (e.g., WiMax, CDMA, Wideband CDMA (WCDMA), Universal Terrestrial Radio Access (UTRA), Evolved UTRA (E-UTRA), GSM, FDMA, GSM, TDMA, etc.).

Also, a UE may be capable of operating in multiple RATs at the same time. For example, a UE that can operate in both LTE and NR simultaneously is an E-UTRA-NR Dual Connectivity (ENDC) capable UE. Note that ENDC is an example of Multi-RAT DC (MRDC) capability. In general, when an MRDC capable UE is operating in two RATs, it may be communicating with a base station (e.g., eNB) of a first RAT (e.g., LTE) and with a base station (e.g., gNB) of a second RAT (e.g., NR). When the UE operates in the first RAT, it may communicate with a network node (e.g., base station, eNB, etc.) of the first RAT. Similarly, when the UE operates in the second RAT, it may communicate with a network node (e.g., base station, gNB, etc.) of the second RAT.

In Third Generation Partnership Project (3GPP) Release 16 (Rel-16), conditional handover (CHO) is introduced to improve the robustness of the handover (HO) process. In legacy handover (HO), the UE transmits measurement reports if the channel or link to the serving cell degrades or a signal from a neighboring cell becomes stronger or better than the serving cell. Based on the measurement reports, the network—the serving cell—can handover the UE to the neighboring cell as the new serving cell. In this way, the UE will have better radio conditions.

However, if the handover process starts when the link between the UE and the current serving cell starts to degrade, the conditions may be such that the measurement reports from the UE does not reach the serving cell. Even if the measurement reports reach the serving cell, and the handover decision is made, the HO command may not reach the UE. Result is that radio link failure (RLF) can occur, in which case, the UE and the network perform recovery process which can consume significant amount of resources.

CHO can reduce the likelihood of such failures by the network (through the serving cell) sending the handover command—CHO command—in advance when the radio conditions are good. When the UE receives the CHO command, it does not apply the command immediately. Instead, the handover is executed later if the condition or conditions associated with the CHO command are fulfilled. For example, one condition may be that if strength and/or quality of a signal from a neighboring cell is some threshold dB greater than strength and/or quality of a signal from the current serving cell, the handover may be triggered. Another condition may be that if the strength and/or quality of the signal from the current serving cell falls below a minimum threshold, then the handover may be triggered. In an aspect, the handover may be triggered if a certain combination of the conditions is met. For convenience and ease of reference, "CHO condition" will be used to refer to such conditions.

As a part of CHO, a plurality of cells (e.g., upto a maximum number (e.g., 8)) can be prepared in advance by the network for the UE to perform the conditional handover, e.g., to serve as the next serving cells for the UE. When multiple cells of the plurality cells satisfy the CHO conditions for the handover, the UE may select one of them as a target cell, and perform the handover to the target cell. For ease of reference and description, term "CHO candidate cell" will be used to refer to a cell of the plurality of cells that satisfies the one or more CHO conditions for handover. Then the following may be said: when there are multiple CHO candidate cells, the UE may select one of them as the target cell, and perform the handover to the target cell. If the handover is successful, then the target cell becomes the new serving cell to the UE.

The UE may be configured to consider various factors when selecting the target cell among the multiple CHO candidate cells. For example, the UE may consider channel conditions, bandwidths (BW), whether the UE has multiple SIMS, and cell priorities, among others. These considerations are explained in more detail below.

Selection Based on Channel Conditions:

In an aspect, a UE may evaluate interferences associated with each of the multiple CHO candidate cells and select the target cell based on the evaluation. For example, the target cell may be cell with the least interference among the multiple CHO candidate cells. In evaluating interferences, the UE may measure one or more signals for each CHO candidate cell. The measured signal parameters may include any one or more of signal-to-noise ratio (SNR), signal-to-interference-plus-noise ratio (SINR), reference signal receive power (RSRP), reference signal receive quality (RSRQ), etc.

In another aspect, it is possible that a CHO candidate cell may be on an inter-frequency or on inter-band that may cause an in-device coexistence (IDC) interference within the UE. In such cases, the UE may refrain from making measurements of that CHO candidate cell. This implies such CHO candidate cells are very unlikely to be selected as the target cell.

In yet another aspect, when beams are used, the UE's selection may be based on a number of beams of each CHO candidate cell satisfying a threshold criteria. In such scenarios, the target cell may be the CHO candidate cell with the most number of beams satisfying the threshold criteria. For example, assume that a threshold criteria for a beam is RSRP >90 dB, i.e., a beam's RSRP should be greater than 90 dB. Between CHO candidate cells A and B, if three beams of CHO candidate cell A and four beams of CHO candidate cell B satisfy the threshold criteria, then CHO candidate cell B may be selected as the target cell over CHO candidate cell A.

Selection Based on Bandwidth (BW):

UE may select among the target cell based on the BWs of the CHO candidate cells. Depending on the circumstances, different CHO candidate cell may be selected as the target cell. For example, if power saving is deemed important, then the CHO candidate cell with the lowest BW may be selected as the target cell. On the other hand, if performance is deemed important, then the CHO candidate cell with highest BW may be selected. In another aspect, a CHO candidate cell that best matches the UE's BW needs may be selected. For example, if the UE is mostly idle, then a low BW CHO candidate cell may be selected. On the other hand, if high data rate is called for (e.g., user may be streaming videos), then the UE may select a high BW CHO candidate cell as the target cell. In other words, the selection based on BW may be dynamic.

MultiSIM Scenarios:

In an aspect, if the UE is operating as a multiSIM UE, the UE may select the target cell based on a discontinuous reception (DRX) configuration. For example, the target cell may be the CHO candidate cell whose DRX configuration is such that the DRX off period overlaps with the UE's tune-away period from one subscription (SUB) to another SUB. If multiple CHO candidate cells have DRX off periods that overlap with the tune-away period, then the target cell may be the CHO candidate cell with the most overlap.

Below, overlap between DRX off period and tune-away period will be used for descriptive purposes. But it should be noted that equivalent alternative perspectives and concepts be covered. As an illustration, regarding the example above, the target cell may be the CHO candidate cell whose DRX configuration is such that the DRX on period does not overlap with the UE's tune-away period. If multiple CHO candidate cells have DRX on periods that do not overlap with the tune-away period, then the target cell may be the CHO candidate cell with the DRX on period that overlaps least with the tune-away period.

Priority Based:

In an aspect, when the UE is in idle state, it may receive cell priorities from the network (e.g., from the serving cell). The cell priorities indicate priorities of the cells of the network for selection when the UE to perform a handover. In other words, it is proposed to use cell priorities for CHO cell selection. For example, the network may indicate that selection of cell A is prioritized over selection of cell B which is prioritized over selection of cell C, and so on. The network may set the priorities for purposes such as load balancing. The UE may select the CHO candidate cell based on the priorities among the CHO candidate cells.

In another aspect, if the UE is a multiSIM, then one subscription (SUB) may utilize the cell priorities of another SUB in selecting the target cell. For example, assume the following:

UE is multiSIM, i.e., has multiple subscriptions (SUBs);
At least two SUBs—first and second SUBs—are from a same operator;
First SUB is connected (e.g., in connected state) and second SUB is idle (e.g., in idle state).

In this instance, the first (connected) SUB may select the target cell based on the cell priorities of the second (idle) SUB. As indicated above, the second SUB may receive its cell priorities from the network when the second SUB is in the idle state. The received cell priorities should be valid for the first SUB since both SUBs are from the same network operator.

While some specific factors (e.g., channel conditions, bandwidths (BW), whether the UE has multiple SIMS, and cell priorities) are discussed, it should be kept in mind that the UE may select the target cell based on other considerations.

As indicated, when there are multiple CHO candidate cells (e.g., cells that satisfy the CHO conditions configured in the UE), the UE may consider one or more factors when selecting the target cell from among the multiple CHO candidate cells. In one aspect, weights may be assigned to the various factors, and the target cell may be selected based on the weighted factors.

Figure 3:
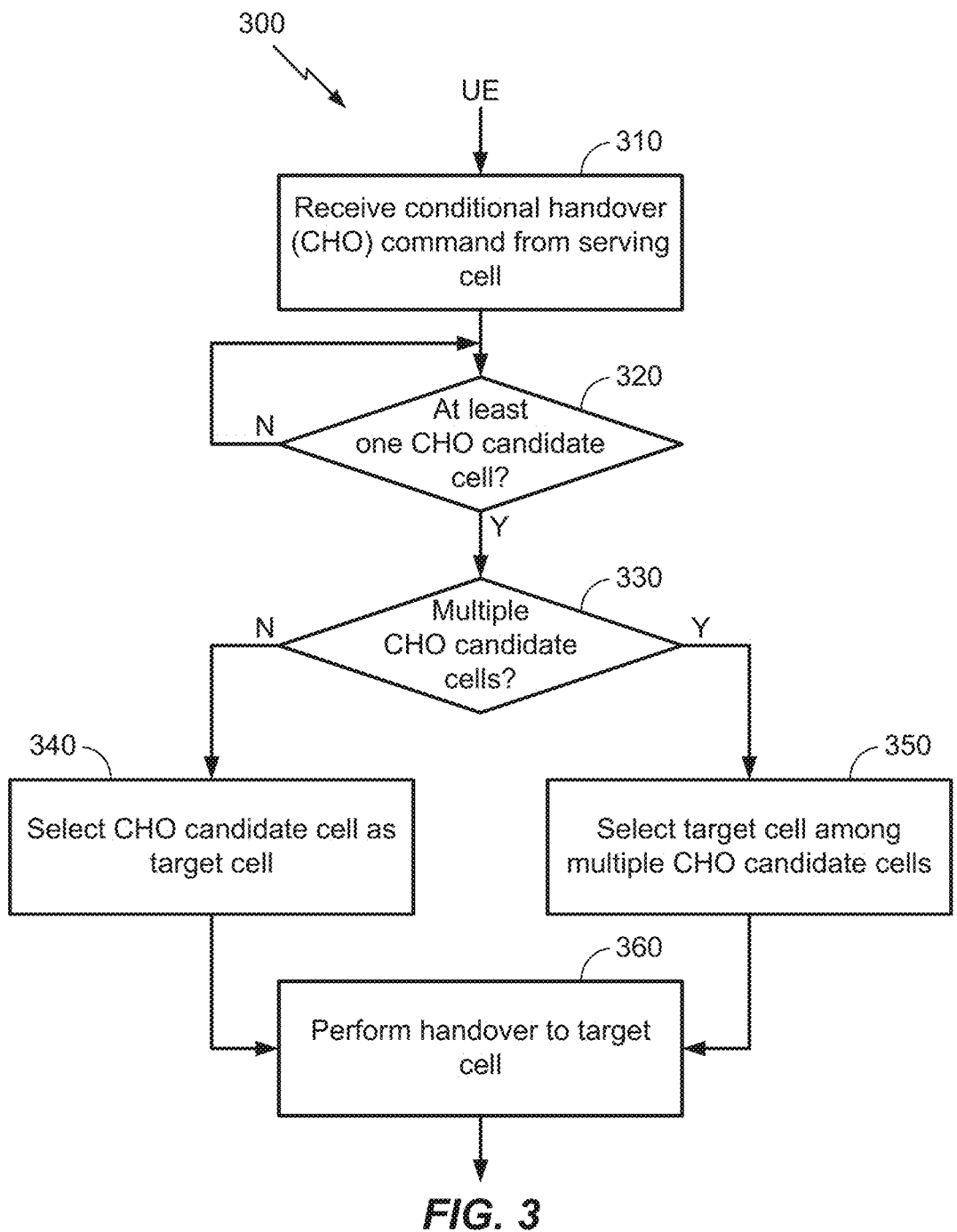
FIGS. 3-5 illustrate flow charts of an exemplary method performed by a user equipment for cell selection for conditional handover in accordance with one or more aspects of the disclosure.

But in another aspect, the target cells may be chosen in a hierarchical manner. FIG. 3 illustrates a flow chart of an exemplary method 300 performed by a UE, e.g., to select a cell for a conditional handover in accordance with one or more aspects of the disclosure. Here, the UE (such as the apparatus 202) may be capable of operating in multiple radio access technologies (RATs) such as 5G NR and 4G LTE RATs among others. The UE may also be operating as a multiSIM UE, e.g., may include multiple subscriptions (SUBs). The memory component 238 may be viewed as an example of a non-transitory computer-readable medium that stores computer-executable instructions to operate components of the UE such as the communication device 208 (including transmitter 210 and receiver 212), the processing system 232 (including one or more processors), memory component 238, etc.

In block 310, the UE (e.g., processing system 232, memory component 238, communication device 208, etc.) may receive a conditional handover (CHO) command from a serving cell of a network. The CHO command may include a CHO configuration comprising one or more CHO conditions and a plurality of cells. The one or more CHO conditions may specify condition or conditions, when any cell of the plurality of cells, can trigger a handover of the UE from the serving cell to a target cell, in which the target cell is one of the plurality of cells that meets the CHO condition or conditions. In other words, the target cell is one of the one or more CHO candidate cells.

Note that when more than one CHO condition are included, in one aspect, it may be required that all CHO conditions be met to trigger the handover. But in another aspect, it need not be required that all CHO conditions be met for the handover to be triggered. That is, meeting some CHO conditions may be sufficient to trigger the handover. For example, handover may be triggered if the signal from the current serving cell falls below a minimum threshold, the handover may be triggered. But in another example, even if the signal from the current serving is at the minimum threshold or above, if a signal from a neighbor cell is significantly better (e.g., greater by at least some threshold dB), then handover to that neighbor cell may be triggered.

In block 320, the UE (e.g., processing system 232, memory component 238, communication device 208, measurement component 252, etc.) may determine whether there is at least one CHO candidate cell. For example, the UE may monitor its surroundings to determine if any of the plurality of cells meet the one or more CHO conditions sufficient to trigger the conditional handover. If not ("N" branch from block 320), the UE may continue monitoring its environment.

On the other hand, if the UE determines that there is at least one CHO candidate cell ("Y" branch from block 320), then in block 330, the UE (e.g., processing system 232, memory component 238, measurement component 252, etc.) may determine whether there are multiple CHO candidate cells. In other words, the UE may determine whether more than one cell of the plurality of cells satisfy the one or more CHO conditions.

If not ("N" branch from block 330), this implies that there is only one, i.e., a single CHO candidate cell. In this instance, in block 340, the UE (e.g., processing system 232, memory component 238, etc.) may select the single CHO candidate cell as the target cell.

On the other hand, if the UE determines that there are multiple CHO candidate cells ("Y" branch from block 330), then in block 350, the UE (e.g., processing system 232, memory component 238, communication device 208, measurement component 252, first data subscription 256, second data subscription 258, etc.) may select the target cell among the multiple CHO candidate cells.

Figure 4:
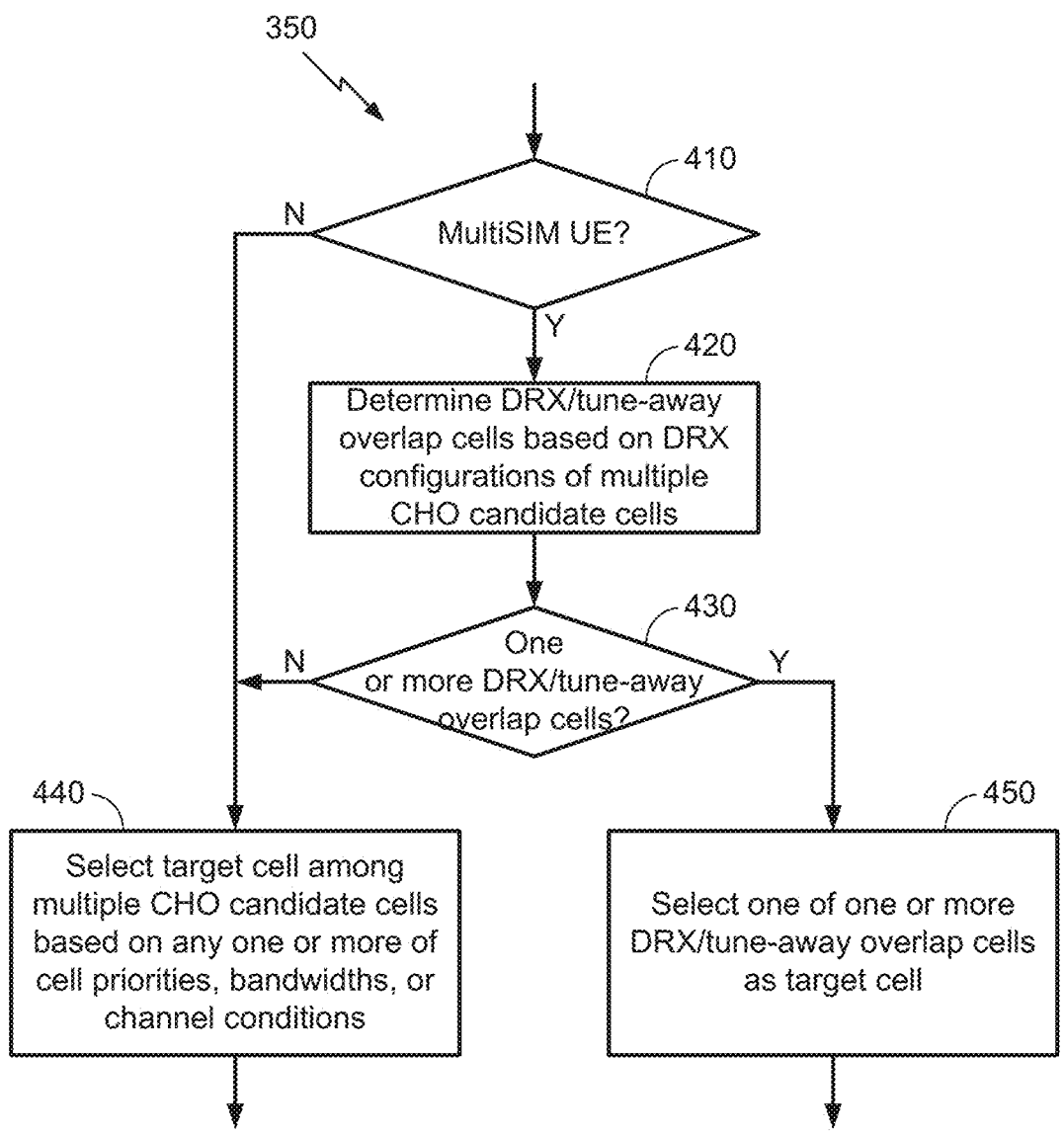

FIG. 4 illustrates a flow chart of an example process performed by the UE to implement block 350. Blocks of FIG. 4 may be performed when there are multiple CHO candidate cells. In block 410, the UE (e.g., processing system 232, memory component 238, communication device 208, measurement component 252, first data subscription 256, second data subscription 258, etc.) may determine whether the UE is operating as a multiSIM UE. That is, the UE may determine whether there are multiple subscriptions (SUBs) operating within the UE. Note that even if a UE is multiSIM capable, it may not be operating as a multiSIM UE. For example, only one SIM may be incorporated within the UE.

Before proceeding further, the following is noted. While block 410 is shown in FIG. 4, this is not to indicate that the UE is actually required to perform the block 410, although it may do so. Generally, this block is included to indicate that depending on whether the UE is or is not operating as a multiSIM UE, different paths of blocks may be performed.

If the UE is operating as the multiSIM UE ("Y" block from block 410), then in block 420, the UE (e.g., processing system 232, memory component 238, first data subscription 256, second data subscription 258, etc.) may determine, for each of the multiple CHO candidate cells, an overlap between a tune-away period of the UE and a DRX off period of a DRX configuration of that CHO candidate cell. In an aspect, the tune-away period may be defined as a period of time in which the UE tunes its radio frequency (RF) receive chain from one SUB to another SUB. For ease and convenience, "DRX/tune-away overlap" will be used. Thus, in block 420, it may be said that the UE may determine the DRX/tune-away overlap of each CHO candidate cell.

In block 430, the UE (e.g., processing system 232, memory component 238, communication device 208, first data subscription 256, second data subscription 258, etc.) may determine whether there are any (i.e., one or more) DRX/tune-away overlap cells among the multiple CHO cells. In an aspect, a cell—e.g., a CHO candidate cell—may be considered to be a DRX/tune-away overlap cell when the DRX off period of the cell overlaps, at least in part, with the tune-away period of the UE. That is, there is a non-zero overlap.

If there are one or more DRX/tune-away overlap cells among the multiple CHO candidate cells ("Y" branch from block 430), then in block 450, the UE may select one of the one or more DRX/tune-away overlap cells as the target cell. If there are multiple DRX/tune-away overlap cells, then in one aspect, the UE may select one of them (e.g., random, first one, etc.). In another aspect, the UE may select the CHO candidate cell with the DRX off period that overlaps the most with the tune-away period.

If the UE is not operating as the multiSIM UE ("N" block from block 410) or if there are no DRX/tune-away overlap cells among the multiple CHO candidate cells ("N" block from block 430), then in block 440, the UE (e.g., processing system 232, memory component 238, communication device 208, first data subscription 256, second data subscription 258, etc.) may select the target cell among the multiple CHO candidate cells based on any one or more of the cell priorities, bandwidths, or channel conditions associated with the multiple CHO candidate cells.

For example, the UE may select the CHO candidate cell with the highest cell priority among the multiple CHO candidate cells as the target cell. Recall that when the UE is in idle state, the cell priorities may be received from the network, e.g., from the serving cell.

Alternatively, the UE may select the CHO candidate cell in consideration of the bandwidths of the multiple CHO candidate cells. In one example, the CHO candidate cell with the lowest bandwidth among the multiple CHO candidate cells may be selected, e.g., if power savings was desired. In another example, the CHO candidate cell with the bandwidth that best meets the current bandwidth demand of the UE may be selected (e.g., high bandwidth cell may be selected if the UE is streaming video).

In another alternative, the UE may select the CHO candidate cell that minimizes interferences. For example, the UE may determine interferences of each CHO candidate cell based on measurements of one or more signal parameters such as SNR, SINR, RSRP, RSRQ, and so on.

Recall that some cell can be on an inter-frequency or inter-band that causes IDC interference within the UE. In an aspect, if any CHO candidate cell operates in such inter-frequency or inter-band, the UE may disqualify such CHO candidate cell from being selected as the target cell. The disqualification may apply even if the channel conditions are not considered. For example, if there is an IDC causing CHO candidate cell, the UE may refrain from considering its bandwidth, refrain from considering its cell priority, and so on.

In one aspect, block 440 may be performed by assigning weights to the factors—cell priorities, bandwidths, and channels conditions—and select the target cell based on the assigned weights.

Alternatively, these factors may be hierarchically considered. For example, while not shown, the UE may consider the cell priorities above the bandwidths and the channel conditions. That is, the UE may select the highest priority CHO candidate cell as the target cell. The bandwidths and/or the channels conditions may be considered only when there is a tie in the cell priorities. For example, if there are two or more CHO candidate cells with the same highest priority, then the selection may be made among the two or more CHO candidate cells based on the bandwidths or the channel conditions associated with the two or more CHO candidate cells.

In an aspect, while not shown, the bandwidth and the channel condition may also be hierarchically considered. For example, if the consideration of bandwidths results in a tie, then the channel conditions among the bandwidth tied CHO candidate cells may be considered to choose the target cell. Alternatively, if the consideration of channel conditions results in a tie, then the bandwidths among the channel condition tied CHO candidate cells may be considered to choose the target cell.

Figure 5:
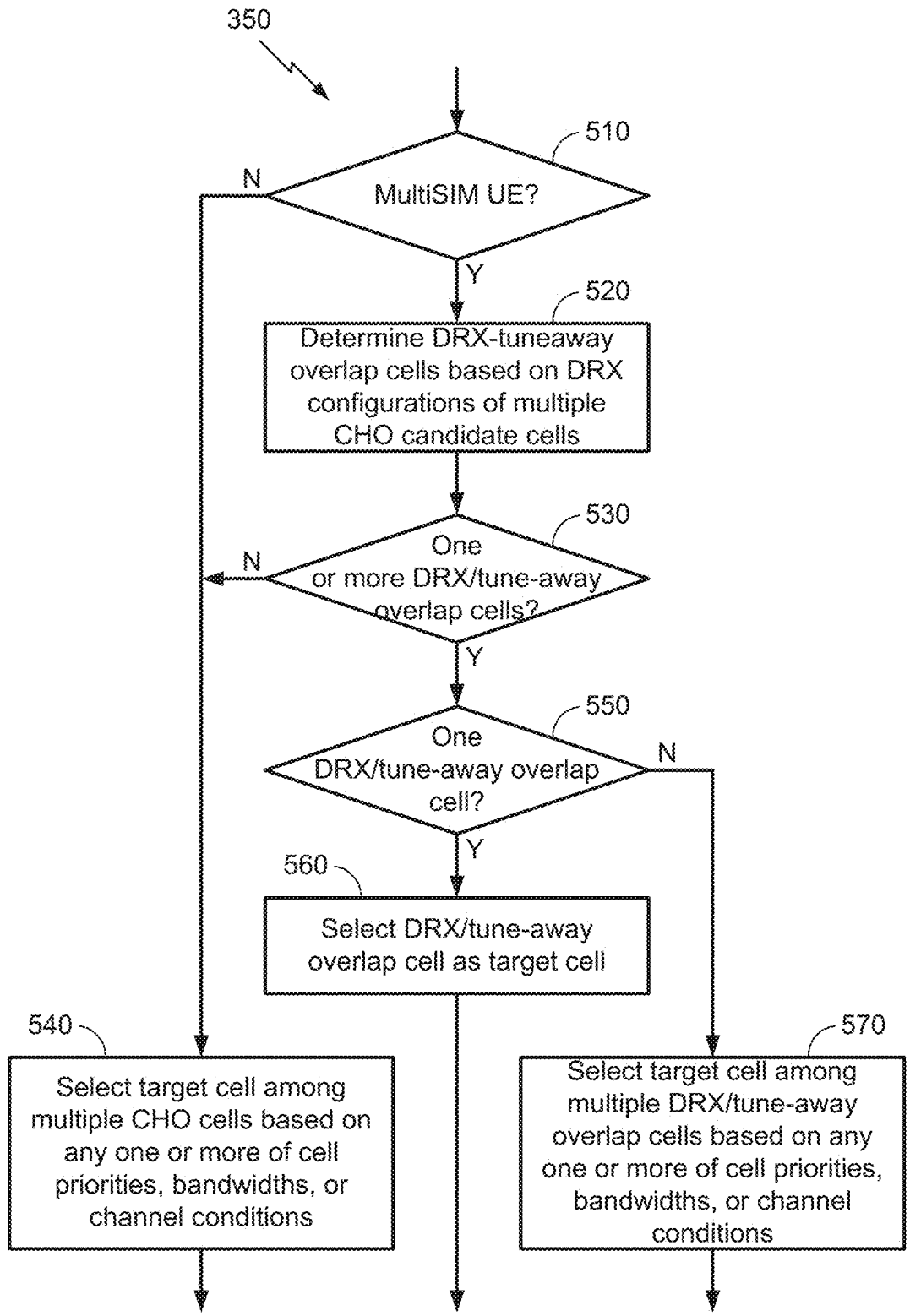

FIG. 5 illustrates a flow chart of another example process performed by the UE to implement block 350. Blocks of FIG. 5 may be performed when there are multiple CHO candidate cells. Blocks 510, 520, 530 and 540 may be similar to blocks 410, 420, 430 and 440, respectively. Therefore, detailed descriptions of 510, 520, 530 and 540 will be omitted for sake of conciseness.

One difference between FIGS. 4 and 5 is that when there are multiple (more than one) DRX/tune-away overlap cells, then other factors (e.g., cell priorities, bandwidths, channel conditions, etc.) may also be considered when selecting the target cell. Thus, the description of FIG. 5 will begin at block 550. When the UE determines that there is at least one DRX/tune-away overlap cell ("Y" branch from block 530), then in block 550, the UE (e.g., processing system 232, memory component 238, etc.) may determine whether there is one DRX/tune-away overlap cell among the multiple CHO candidate cells.

If there is one, i.e., a single DRX/tune-away overlap cell ("Y" branch from block 550), then in block 560, the UE (e.g., processing system 232, memory component 238, etc.) may select the single DRX/tune-away overlap cell as the target cell.

On the other hand, if there are multiple DRX/tune-away overlap cells ("N" branch from block 550), then in block 570, the UE (e.g., processing system 232, memory component 238, communication device 208, measuring component 252, first data subscription 256, second data subscription 258, etc.) may select the target cell among the multiple DRX/tune-away overlap cells based on any one or more of the cell priorities, bandwidths, or channel conditions associated with the DRX/tune-away overlap cells.

In one aspect, the UE may select the DRX/tune-away overlap cell with the highest cell priority among the DRX/tune-away overlap cells as the target cell. Note that block 570 is reached if the UE is operating as a multiSIM UE, e.g., the UE may be incorporated with multiple SUBs. In this instance, if two or more SUBs are from a same operator, then cell priorities maintained by one SUB may be utilized by another SUB. For example, if first and second SUBs of the UE from a same operator are in connected and idle states, respectively, the first SUB may select the target cell based on the cell priorities of the second SUB, e.g., select the highest priority cell among the DRX/tune-away overlap cells. The second SUB may have received the cell priorities from the serving cell since in the idle state prior to the first SUB selecting the target cell.

Alternatively, the UE may select the target cell in consideration of the bandwidths of the multiple DRX/tune-away overlap cells. In one example, the DRX/tune-away overlap cell with the lowest bandwidth among the multiple DRX/tune-away overlap cells may be selected, e.g., if power savings was desired. In another example, the DRX/tune-away overlap cell with the bandwidth that best meets the current bandwidth demand of the UE may be selected (e.g., high bandwidth cell may be selected if the UE is streaming video).

In another alternative, the UE may select the DRX/tune-away overlap cell that minimizes interferences. For example, the UE may determine interferences of each DRX/tune-away overlap cell based on measurements of one or more signal parameters such as SNR, SINR, RSRP, RSRQ, and so on.

In an aspect, if any DRX/tune-away overlap cell operates in such inter-frequency or inter-band, the UE may disqualify such CHO candidate cell from being selected as the target cell. The disqualification may apply even if the channel conditions are not considered.

In one aspect, block 570 may be performed by assigning weights to the factors—cell priorities, bandwidths, and channels conditions—and select the target cell based on the assigned weights.

Alternatively, these factors may be hierarchically considered. For example, while not shown, the UE may consider the cell priorities above the bandwidths and the channel conditions. That is, the UE may select the highest priority DRX/tune-away overlap cell as the target cell. The bandwidths and/or the channels conditions may be considered only when there is a tie in the cell priorities. For example, if there are two or more DRX/tune-away overlap cells with the same highest priority, then the selection may be made among the two or more DRX/tune-away overlap cells based on the bandwidths or the channel conditions associated with the two or more CHO candidate cells.

In an aspect, while not shown, the bandwidth and the channel condition may also be hierarchically considered. For example, if the consideration of bandwidths results in a tie, then the channel conditions among the bandwidth tied DRX/tune-away overlap cells may be considered to choose the target cell. Alternatively, if the consideration of channel conditions results in a tie, then the bandwidths among the channel condition tied DRX/tune-away overlap cells may be considered to choose the target cell.

Referring back to FIG. 3, in block 360, the UE (e.g., processing system 232, memory component 238, communication device 208, first data subscription 256, second data subscription 258, etc.) may perform the handover to the target cell.

Figure 6:
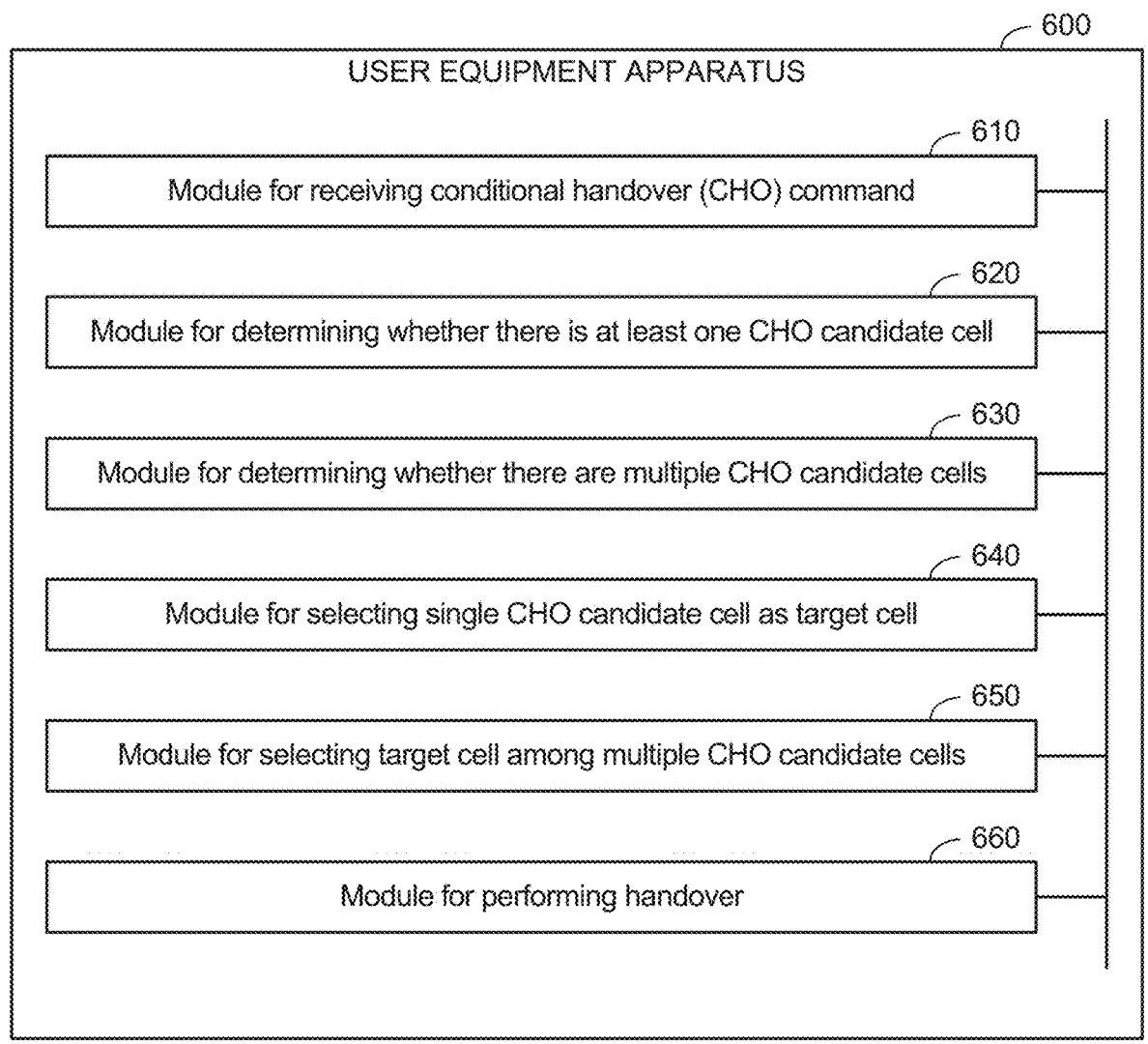
FIG. 6 illustrates a simplified block diagram of several sample aspects of an apparatus configured cell selection for conditional handover in accordance with one or more aspects of the disclosure.

FIG. 6 illustrates an example user equipment apparatus 600 represented as a series of interrelated functional modules connected by a common bus. Each of the modules may be implemented in hardware or as a combination of hardware and software. For example, the modules may be implemented as any combination of the modules of the apparatus 202 of FIG. 2. A module for receiving the conditional handover (CHO) command 610 may correspond at least in some aspects to a communication device (e.g., communication device 208), a processing system (e.g., processing system 232) and/or a memory component (e.g., memory component 238). A module for determining whether there is at least one CHO candidate cell 620 may correspond at least in some aspects to a communication device (e.g., communication device 208), a processing system (e.g., processing system 232), a memory component (e.g., memory component 238), and/or a measurement component (e.g., measurement component 252). A module for determining whether there is at least one CHO candidate cell 630 may correspond at least in some aspects to a communication device (e.g., communication device 208), a processing system (e.g., processing system 232), a memory component (e.g., memory component 238), and/or a measurement component (e.g., measurement component 252). A module for selecting a single CHO candidate cell as the target cell 640 may correspond at least in some aspects to a processing system (e.g., processing system 232) and/or a memory component (e.g., memory component 238). A module for selecting the target cell among multiple CHO candidate cells 650 may correspond at least in some aspects to a communication device (e.g., communication device 208), a processing system (e.g., processing system 232), a memory component (e.g., memory component 238), one or more data subscriptions (e.g., first data subscription 256, second data subscription 258) and/or a measurement component (e.g., measurement component 252). A module for performing the handover 660 may correspond at least in some aspects to a communication device (e.g., communication device 208), a processing system (e.g., processing system 232) and/or a memory component (e.g., memory component 238).

The functionality of the modules of FIG. 6 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 6, as well as other components and functions described herein, may be implemented using any suitable means. Such means also may be implemented, at least in part, using corresponding structure as taught herein. For example, the components described above in conjunction with the "module for" components of FIG. 6 also may correspond to similarly designated "means for" functionality. Thus, in some aspects one or more of such means may be implemented using one or more of processor components, integrated circuits, or other suitable structure as taught herein.

Figure 7:
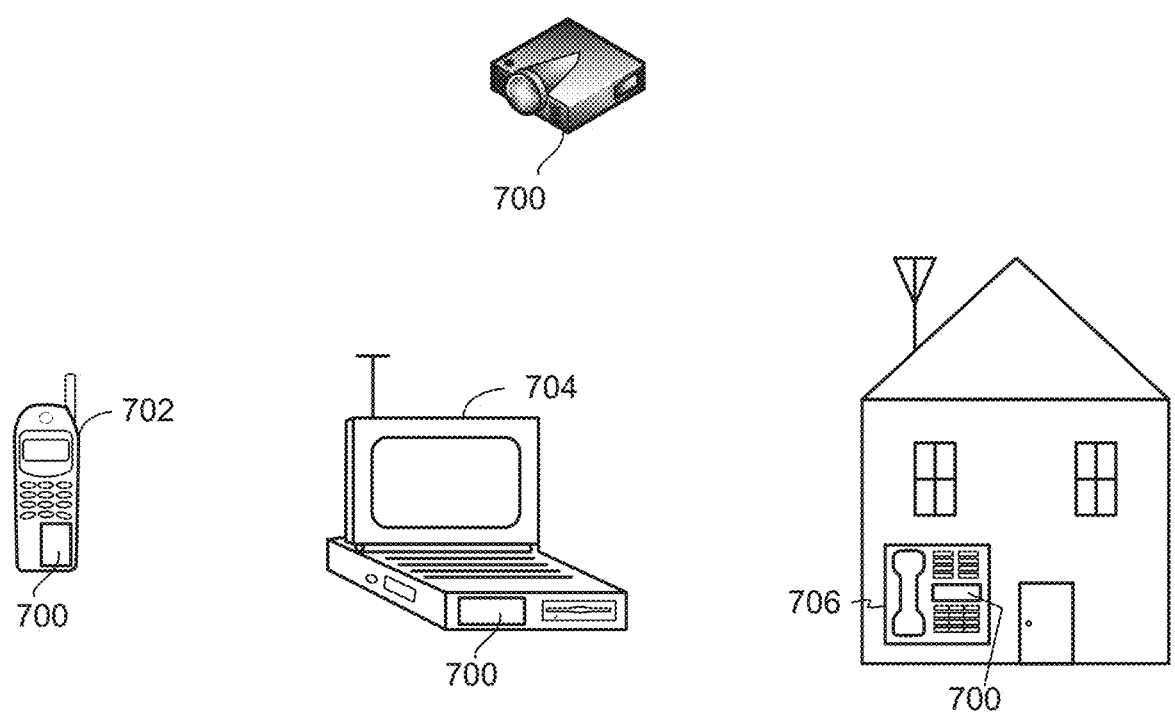
FIG. 7 illustrates non-limiting examples of devices with cell selection devices integrated therein.

FIG. 7 illustrates various electronic devices that may be integrated with the aforementioned apparatus illustrated in FIG. 2. For example, a mobile phone device 702, a laptop computer device 704, a terminal device 706 as well as wearable devices, portable systems, that require small form factor, extreme low profile, may include an apparatus 700 that incorporates the aforementioned devices/systems as described herein. The apparatus 700 may also be a stand-alone device, such as a video sensor, a toy, a fixed sensor, an IoT (Internet of Things) device, etc. The devices 702, 704, 706 illustrated in FIG. 7 are merely exemplary. Other electronic devices may also feature the apparatus 700 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles, or any other device that stores or retrieves data or computer instructions, or any combination thereof.

The following provides an overview of examples of the present disclosure:

Example 1: A method of a user equipment (UE), comprising: receiving a conditional handover (CHO) command from a serving cell, the CHO command including a CHO configuration comprising one or more CHO conditions and a plurality of cells, the one or more CHO conditions specifying one or more conditions, when met by one or more of the plurality of cells, triggers a handover of the UE from the serving cell to a target cell, the target cell being one of the plurality of cells; selecting a target cell among multiple CHO candidate cells, each CHO candidate cell being a cell of the plurality of cells that satisfies the one or more CHO conditions; and performing a handover to the target cell, wherein selecting the target cell comprises selecting (420-470) the target cell among the multiple CHO candidate cells based on discontinuous reception (DRX) configurations of the multiple CHO candidate cells when the UE is operating as a multiple subscriber identity module (multiSIM) UE.

Example 2: The method of example 1, wherein when the UE is operating as the multiSIM UE, selecting the target cell comprises: determining DRX/tune-away overlap cells among the multiple CHO candidate cells based on the DRX configurations of the multiple CHO candidate cells, wherein each CHO candidate cell is a DRX/tune-away overlap cell when a DRX off period of that CHO candidate cell overlaps with a tune-away period of the UE, the tune-away period being a period of time in which the UE tunes its radio frequency (RX) receive chain from one subscription (SUB) to another SUB; and selecting, when it is determined that there are one or more DRX/tune-away overlap cells, one of the one or more DRX/tune-away overlap cells as the target cell.

Example 3: The method of example 2, wherein selecting one of the one or more DRX/tune-away overlap cells as the target cell comprises: selecting the CHO candidate cell with the DRX off period that overlaps the most with the tune-away period of the UE as the target cell.

Example 4: The method of any of examples 1-3, wherein when the UE is operating as the multiSIM UE, selecting the target cell further comprises: selecting, when it is determined that there are no DRX/tune-away overlap cells, the target cell among the multiple CHO candidate cells based on any combination of cell priorities of the multiple CHO candidate cells, bandwidths (BW) of the multiple CHO candidate cells, or channel conditions associated with the multiple CHO candidate cells.

Example 5: The method of any of examples 1-4, wherein when the UE is operating as the multiSIM UE, selecting the target cell comprises: determining DRX/tune-away overlap cells among the multiple CHO candidate cells based on the DRX configurations of the multiple CHO candidate cells, wherein each CHO candidate cell is a DRX/tune-away overlap cell when a DRX off period of that CHO candidate cell overlaps with a tune-away period of the UE, the tune-away period being a period of time in which the UE tunes its radio frequency (RX) receive chain from one subscription (SUB) to another SUB; and selecting, when it is determined that there are multiple DRX/tune-away overlap cells, one of the multiple DRX/tune-away overlap cells as the target cell based on any combination of cell priorities of the multiple DRX/tune-away candidate cells, bandwidths (BW) of the multiple DRX/tune-away candidate cells, or channel conditions associated with the multiple DRX/tune-away candidate cells.

Example 6: The method of example 5, wherein when the UE is operating as the multiSIM UE, selecting the target cell further comprises: selecting, when it is determined that there is a single DRX/tune-away overlap cell, the single DRX/tune-away overlap cell as the target cell.

Example 7: The method of any of examples 5-6, wherein the UE comprises at least first and second subscriptions (SUBs) from a same operator in which the first SUB is in a connected state and the second SUB is in an idle state, and wherein when it is determined that there are multiple DRX/ tune-away overlap cells, the first SUB selects the target cell among the multiple DRX/tune-away overlap cells based on cell priorities maintained by the second SUB, the cell priorities indicating priorities of the cells of a network for cell selection by the UE for handover.

Example 8: The method of any of examples 1-7, wherein when it is determined that there are multiple DRX/tune-away overlap cells, the DRX/tune-away overlap cell with the highest cell priority among the DRX/tune-away overlap cells is selected as the target cell.

Example 9: The method of example 8, wherein when there are two or more DRX/tune-away overlap cells with the highest cell priorities, the DRX/tune-away overlap cell with the lowest bandwidth (BW) among the two or more DRX/tune-away overlap cells is selected as the target cell, or the DRX/tune-away overlap cell with lowest interference among the two or more DRX/tune-away overlap cells is selected as the target cell.

Example 10: The method of example 9, wherein the interference of each of the two or more DRX/tune-away overlap cells is determined based on measurements of one or more signal parameters of that DRX/tune-away overlap cells, the one or more signal parameters comprising any one or more of signal-to-noise ratio (SNR), signal-to-interference-plus-noise ratio (SINR), reference signal receive power (RSRP), and reference signal receive quality (RSRQ).

Example 11: The method of any of examples 1-10, wherein when the UE is not operating as the multiSIM UE, selecting the target cell further comprises: selecting the target cell among the multiple CHO candidate cells based on any combination of cell priorities of the multiple CHO candidate cells, bandwidths (BW) of the multiple CHO candidate cells, or channel conditions associated with the multiple CHO candidate cells.

Example 12: The method of example 11, wherein the CHO candidate cell with the highest cell priority among the multiple CHO candidate cells is selected as the target cell.

Example 13: The method of example 12, wherein when there are two or more CHO candidate cells with the highest cell priorities, the CHO candidate cell with the lowest bandwidth (BW) among the two or more CHO candidate cells is selected as the target cell, or the CHO candidate cell with lowest interference among the two or more CHO candidate cells is selected as the target cell.

Example 14: The method of any of examples 1-13, wherein for each of the multiple CHO candidate cells, that CHO candidate cell is disqualified from being selected as the target cell when that CHO candidate cell is on an inter-frequency or inter-band that causes an in-device coexistence (IDC) interference within the UE.

Example 15: A user equipment comprising at least one means for performing a method of any of examples 1-14.

Example 16: A user equipment comprising a processor, memory coupled with the processor, the processor and memory configured perform a method of examples 1-14.

Example 17: A non-transitory computer-readable medium storing code for a user equipment comprising a processor, memory coupled with the processor, and instructions stored in the memory and executable by the processor to cause the user equipment to perform a method of any of examples 1-14.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
a processor;
a memory; and
a transceiver,
wherein the processor, the memory, and/or the transceiver are configured to:
receive a conditional handover (CHO) command from a serving cell, the CHO command including a CHO configuration comprising one or more CHO conditions and a plurality of cells, the one or more CHO conditions specifying one or more conditions, when met by one or more of the plurality of cells, triggers a handover of the UE from the serving cell to a target cell, the target cell being one of the plurality of cells;
select a target cell among multiple CHO candidate cells, each CHO candidate cell being a cell of the plurality of cells that satisfies the one or more CHO conditions; and
perform a handover to the target cell,
wherein in selecting the target cell, the memory, and/or the transceiver are configured to select the target cell among the multiple CHO candidate cells based on discontinuous reception (DRX) configurations of the multiple CHO candidate cells when the UE is operating as a multiple subscriber identity module (multiSIM) UE.

2. The UE of claim 1, wherein in selecting the target cell when the UE is operating as the multiSIM UE, the processor, the memory, and/or the transceiver are configured to:
determine DRX/tune-away overlap cells among the multiple CHO candidate cells based on the DRX configurations of the multiple CHO candidate cells, wherein each CHO candidate cell is a DRX/tune-away overlap cell when a DRX off period of that CHO candidate cell overlaps with a tune-away period of the UE, the tune-away period being a period of time in which the UE tunes its radio frequency (RX) receive chain from one subscription (SUB) to another SUB; and
select, when it is determined that there are one or more DRX/tune-away overlap cells, one of the one or more DRX/tune-away overlap cells as the target cell.

3. The UE of claim 2, wherein in selecting one of the one or more DRX/tune-away overlap cells as the target cell, the processor, the memory, and/or the transceiver are configured to:
select the CHO candidate cell with the DRX off period that overlaps the most with the tune-away period of the UE as the target cell.

4. The UE of claim 2, wherein in selecting the target cell when the UE is operating as the multiSIM UE, the processor, the memory, and/or the transceiver are further configured to:
select, when it is determined that there are no DRX/tune-away overlap cells, the target cell among the multiple CHO candidate cells based on any combination of cell priorities of the multiple CHO candidate cells, bandwidths (BW) of the multiple CHO candidate cells, or channel conditions associated with the multiple CHO candidate cells.

5. The UE of claim 1, wherein in selecting the target cell when the UE is operating as the multiSIM UE, the processor, the memory, and/or the transceiver are configured to:
determine DRX/tune-away overlap cells among the multiple CHO candidate cells based on the DRX configurations of the multiple CHO candidate cells, wherein each CHO candidate cell is a DRX/tune-away overlap cell when a DRX off period of that CHO candidate cell overlaps with a tune-away period of the UE, the tune-away period being a period of time in which the UE tunes its radio frequency (RX) receive chain from one subscription (SUB) to another SUB; and
select, when it is determined that there are multiple DRX/tune-away overlap cells, one of the multiple DRX/tune-away overlap cells as the target cell based on any combination of cell priorities of the multiple DRX/tune-away candidate cells, bandwidths (BW) of the multiple DRX/tune-away candidate cells, or channel conditions associated with the multiple DRX/tune-away candidate cells.

6. The UE of claim 5, wherein in selecting the target cell when the UE is operating as the multiSIM UE, the processor, the memory, and/or the transceiver are further configured to:
select, when it is determined that there is a single DRX/tune-away overlap cell, the single DRX/tune-away overlap cell as the target cell.

7. The UE of claim 5,
wherein the UE comprises at least first and second subscriptions (SUBs) from a same operator in which the first SUB is in a connected state and the second SUB is in an idle state, and
wherein when it is determined that there are multiple DRX/tune-away overlap cells, the first SUB selects the target cell among the multiple DRX/tune-away overlap cells based on cell priorities maintained by the second SUB.

8. The UE of claim 5, wherein when it is determined that there are multiple DRX/tune-away overlap cells, the processor, the memory, and/or the transceiver are configured to:
select the DRX/tune-away overlap cell with the highest cell priority among the DRX/tune-away overlap cells as the target cell.

9. The UE of claim 8, wherein when there are two or more DRX/tune-away overlap cells with the highest cell priorities, the processor, the memory, and/or the transceiver are configured to:
select the DRX/tune-away overlap cell with the lowest bandwidth (BW) among the two or more DRX/tune-away overlap cells as the target cell, or select the DRX/tune-away overlap cell with lowest interference among the two or more DRX/tune-away overlap cells as the target cell.

10. The UE of claim 9, wherein the processor, the memory, and/or the transceiver are configured to determine interference of each of the two or more DRX/tune-away overlap cells based on measurements of one or more signal parameters of that DRX/tune-away overlap cells, the one or more signal parameters comprising any one or more of signal-to-noise ratio (SNR), signal-to-interference-plus-noise ratio (SINR), reference signal receive power (RSRP), and reference signal receive quality (RSRQ).

11. The UE of claim 1, wherein in selecting the target cell when the UE is not operating as the multiSIM UE, the processor, the memory, and/or the transceiver are further configured to:
select the target cell among the multiple CHO candidate cells based on any combination of cell priorities of the multiple CHO candidate cells, bandwidths (BW) of the multiple CHO candidate cells, or channel conditions associated with the multiple CHO candidate cells.

12. The UE of claim 11, wherein the CHO candidate cell with the highest cell priority among the multiple CHO candidate cells is selected as the target cell.

13. The UE of claim 12, wherein when there are two or more CHO candidate cells with the highest cell priorities,
the CHO candidate cell with the lowest bandwidth (BW) among the two or more CHO candidate cells is selected as the target cell, or
the CHO candidate cell with lowest interference among the two or more CHO candidate cells is selected as the target cell.

14. The UE of claim 1, wherein the processor, the memory, and/or the transceiver are configured so that for each of the multiple CHO candidate cells, that CHO candidate cell is disqualified from being selected as the target cell when that CHO candidate cell is on an inter-frequency or inter-band that causes an in-device coexistence (IDC) interference within the UE.

15. A method of a user equipment (UE), the method comprising:
receiving a conditional handover (CHO) command from a serving cell, the CHO command including a CHO configuration comprising one or more CHO conditions and a plurality of cells, the one or more CHO conditions specifying one or more conditions, when met by one or more of the plurality of cells, triggers a handover of the UE from the serving cell to a target cell, the target cell being one of the plurality of cells;
selecting a target cell among multiple CHO candidate cells, each CHO candidate cell being a cell of the plurality of cells that satisfies the one or more CHO conditions; and
performing a handover to the target cell,
wherein selecting the target cell comprises selecting (420-470) the target cell among the multiple CHO candidate cells based on discontinuous reception (DRX) configurations of the multiple CHO candidate cells when the UE is operating as a multiple subscriber identity module (multiSIM) UE.

16. The method of claim 15, wherein when the UE is operating as the multiSIM UE, selecting the target cell comprises:
determining DRX/tune-away overlap cells among the multiple CHO candidate cells based on the DRX configurations of the multiple CHO candidate cells, wherein each CHO candidate cell is a DRX/tune-away overlap cell when a DRX off period of that CHO candidate cell overlaps with a tune-away period of the UE, the tune-away period being a period of time in which the UE tunes its radio frequency (RX) receive chain from one subscription (SUB) to another SUB; and
selecting, when it is determined that there are one or more DRX/tune-away overlap cells, one of the one or more DRX/tune-away overlap cells as the target cell.

17. The method of claim 16, wherein selecting one of the one or more DRX/tune-away overlap cells as the target cell comprises:
selecting the CHO candidate cell with the DRX off period that overlaps the most with the tune-away period of the UE as the target cell.

18. The method of claim 16, wherein when the UE is operating as the multiSIM UE, selecting the target cell further comprises:
selecting, when it is determined that there are no DRX/tune-away overlap cells, the target cell among the multiple CHO candidate cells based on any combination of cell priorities of the multiple CHO candidate cells, bandwidths (BW) of the multiple CHO candidate cells, or channel conditions associated with the multiple CHO candidate cells.

19. The method of claim 15, wherein when the UE is operating as the multiSIM UE, selecting the target cell comprises:
determining DRX/tune-away overlap cells among the multiple CHO candidate cells based on the DRX configurations of the multiple CHO candidate cells, wherein each CHO candidate cell is a DRX/tune-away overlap cell when a DRX off period of that CHO candidate cell overlaps with a tune-away period of the UE, the tune-away period being a period of time in which the UE tunes its radio frequency (RX) receive chain from one subscription (SUB) to another SUB; and
selecting, when it is determined that there are multiple DRX/tune-away overlap cells, one of the multiple DRX/tune-away overlap cells as the target cell based on any combination of cell priorities of the multiple DRX/tune-away candidate cells, bandwidths (BW) of the multiple DRX/tune-away candidate cells, or channel conditions associated with the multiple DRX/tune-away candidate cells.

20. The method of claim 19, wherein when the UE is operating as the multiSIM UE, selecting the target cell further comprises:
selecting, when it is determined that there is a single DRX/tune-away overlap cell, the single DRX/tune-away overlap cell as the target cell.

21. The method of claim 19,
wherein the UE comprises at least first and second subscriptions (SUBs) from a same operator in which the first SUB is in a connected state and the second SUB is in an idle state, and
wherein when it is determined that there are multiple DRX/tune-away overlap cells, the first SUB selects the target cell among the multiple DRX/tune-away overlap cells based on cell priorities maintained by the second SUB.

22. The method of claim 19, wherein when it is determined that there are multiple DRX/tune-away overlap cells, the DRX/tune-away overlap cell with the highest cell priority among the DRX/tune-away overlap cells is selected as the target cell.

23. The method of claim 22, wherein when there are two or more DRX/tune-away overlap cells with the highest cell priorities,
- the DRX/tune-away overlap cell with the lowest bandwidth (BW) among the two or more DRX/tune-away overlap cells is selected as the target cell, or
- the DRX/tune-away overlap cell with lowest interference among the two or more DRX/tune-away overlap cells is selected as the target cell.

24. The method of claim 23, wherein the interference of each of the two or more DRX/tune-away overlap cells is determined based on measurements of one or more signal parameters of that DRX/tune-away overlap cells, the one or more signal parameters comprising any one or more of signal-to-noise ratio (SNR), signal-to-interference-plus-noise ratio (SINR), reference signal receive power (RSRP), and reference signal receive quality (RSRQ).

25. The method of claim 15, wherein when the UE is not operating as the multiSIM UE, selecting the target cell further comprises:
- selecting the target cell among the multiple CHO candidate cells based on any combination of cell priorities of the multiple CHO candidate cells, bandwidths (BW) of the multiple CHO candidate cells, or channel conditions associated with the multiple CHO candidate cells.

26. The method of claim 25, wherein the CHO candidate cell with the highest cell priority among the multiple CHO candidate cells is selected as the target cell.

27. The method of claim 26, wherein when there are two or more CHO candidate cells with the highest cell priorities,
- the CHO candidate cell with the lowest bandwidth (BW) among the two or more CHO candidate cells is selected as the target cell, or
- the CHO candidate cell with lowest interference among the two or more CHO candidate cells is selected as the target cell.

28. The method of claim 15, wherein for each of the multiple CHO candidate cells, that CHO candidate cell is disqualified from being selected as the target cell when that CHO candidate cell is on an inter-frequency or inter-band that causes an in-device coexistence (IDC) interference within the UE.

29. A user equipment (UE) configured to operate in first and second radio access technologies (RATs), comprising:
- means for receiving a conditional handover (CHO) command from a serving cell, the CHO command including a CHO configuration comprising one or more CHO conditions and a plurality of cells, the one or more CHO conditions specifying one or more conditions, when met by one or more of the plurality of cells, triggers a handover of the UE from the serving cell to a target cell, the target cell being one of the plurality of cells;
- means for selecting a target cell among multiple CHO candidate cells, each CHO candidate cell being a cell of the plurality of cells that satisfies the one or more CHO conditions; and
- means for performing a handover to the target cell,
- wherein the means for selecting the target cell selects the target cell among the multiple CHO candidate cells based on discontinuous reception (DRX) configurations of the multiple CHO candidate cells when the UE is operating as a multiple subscriber identity module (multiSIM) UE.

30. A non-transitory computer-readable medium storing computer-executable instructions for a user equipment (UE), the computer-executable instructions comprising:
- one or more instructions instructing the UE to receive a conditional handover (CHO) command from a serving cell, the CHO command including a CHO configuration comprising one or more CHO conditions and a plurality of cells, the one or more CHO conditions specifying one or more conditions, when met by one or more of the plurality of cells, triggers a handover of the UE from the serving cell to a target cell, the target cell being one of the plurality of cells;
- one or more instructions instructing the UE to select a target cell among multiple CHO candidate cells, each CHO candidate cell being a cell of the plurality of cells that satisfies the one or more CHO conditions; and
- one or more instructions instructing the UE to perform a handover to the target cell,
- wherein in selecting the target cell, the one or more instructions instruct the UE to select the target cell among the multiple CHO candidate cells based on discontinuous reception (DRX) configurations of the multiple CHO candidate cells when the UE is operating as a multiple subscriber identity module (multiSIM) UE.

* * * * *